United States Patent
Hare

(12) 
(10) Patent No.: US 6,254,176 B1
(45) Date of Patent: Jul. 3, 2001

(54) RETRACTABLE CORD MOUNTED IN SUNROOF CHANNEL

(75) Inventor: Douglas R. Hare, Rochester Hills, MI (US)

(73) Assignee: Meritor Light Vehicle Technology, LLC, Troy, MI (US)

(*) Notice: Subject to any disclaimer, the term of this patent is extended or adjusted under 35 U.S.C. 154(b) by 0 days.

(21) Appl. No.: 09/567,299

(22) Filed: May 8, 2000

Related U.S. Application Data

(63) Continuation of application No. 09/399,550, filed on Sep. 20, 1999.

(51) Int. Cl.$^7$ .............................. B60J 7/047; B60R 13/07
(52) U.S. Cl. .............. 296/211; 296/216.06; 296/216.07; 296/216.08; 49/404
(58) Field of Search .................... 296/216.07, 216.08, 296/216.06, 211; 49/25, 404

(56) References Cited

U.S. PATENT DOCUMENTS

| | | | |
|---|---|---|---|
| 4,327,316 | * 4/1982 | Fujikubo et al. | 320/2 |
| 4,805,958 | * 2/1989 | Nagata | 296/216 |
| 4,838,607 | * 6/1989 | Mizuma et al. | 296/216 |
| 4,923,245 | * 5/1990 | Kuwabara | 296/216 |
| 4,934,753 | * 6/1990 | Gajewski | 296/216 |
| 5,038,674 | * 8/1991 | Merges | 98/2.02 |
| 5,154,481 | * 10/1992 | Paetz et al. | 296/216 |
| 5,156,435 | * 10/1992 | Farmont | 296/216 |
| 5,261,722 | * 11/1993 | Staley et al. | 296/216 |
| 5,303,974 | * 4/1994 | Schlapp et al. | 296/216 |
| 5,372,401 | * 12/1994 | Odio et al. | 296/214 |
| 5,545,261 | * 8/1996 | Ganz et al. | 296/216 |
| 5,941,598 | * 8/1999 | Cave et al. | 296/216.08 |

* cited by examiner

*Primary Examiner*—D. Glenn Dayoan
*Assistant Examiner*—Greg Blankenship
(74) *Attorney, Agent, or Firm*—Carlson, Gaskey & Olds

(57) ABSTRACT

An improved mounting system for conveying electrical energy to and from a moving glass panel, such as a sunroof, utilizes a retractable cord. The retractable cord is mounted within a channel which guides the glass panel. In this way, the cord is protected.

7 Claims, 2 Drawing Sheets

RETRACTABLE CORD MOUNTED IN SUNROOF CHANNEL

This application is a continuation of Ser. No. 09/399,550 filed Sep. 20, 1999.

BACKGROUND OF THE INVENTION

This application relates to improved positioning for a retractable cord to transfer electrical signals to/from a moving glass panel such as a sunroof.

Sunroofs (or moonroofs) are becoming widely utilized in vehicles. As known, a mechanical connection drives a glass panel between open and closed positions. The glass panel moves within a pair of channels that guide the movement of the glass panel.

Recently, the Assignee of the present application has developed an arrangement wherein a solar cell is mounted on the moving glass panel. This solar cell can be utilized to power the motor for driving the glass panel, or for other purposes. This invention is disclosed in co-pending patent application Ser. No. 09/399,550, filed 20 Sep. 1999, and entitled "Self-Powered Solar Sunroof". This application discloses a method of transmitting electrical power from a sunroof mounted panel to electrical components mounted on the vehicle frame through a coiled electrical wire. The coil is retractable, and may be of the sort typically utilized in telephones.

The above-referenced United States Patent Application does not disclose a particular position or method for mounting and protecting the retractable cord. The present invention provides such positioning and protection.

SUMMARY OF THE INVENTION

In the disclosed embodiment of this invention, a retractable cord extends within a space in a channel which also guides the sunroof glass panel. In this way, the cord is directly connected to the panel, and is protected by the channel. Moreover, the panel has an abutment structure which moves to compress or stretch the cord. The abutment structure may be part of the necessary structure to guide the panel within the channel. In this way, no additional structure need be incorporated onto the panel.

These and other features of the present invention will be best understood from the following specification and drawings, the following of which is a brief description.

DETAILED DESCRIPTION OF A PREFERRED EMBODIMENT

Figure 1:
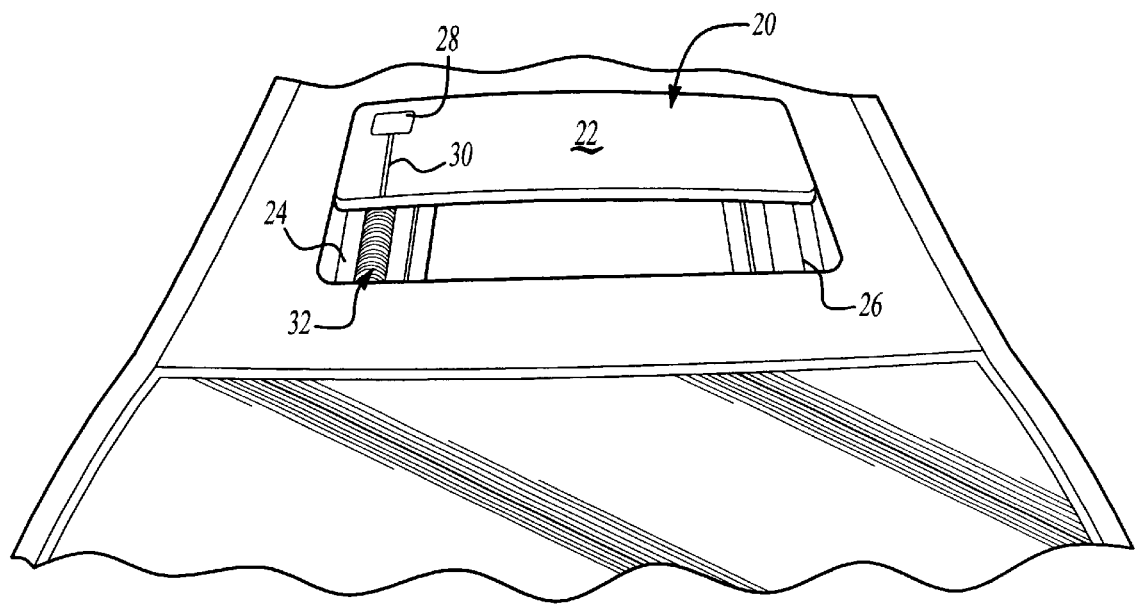
FIG. 1 is a schematic view of a glass panel incorporating in the present invention.

FIG. 1 schematically shows a vehicle sunroof 20 incorporating a moving glass panel 22, as known. The structure for moving and guiding the panel are as known and form no portion of this invention. A pair of channels 24 and 26 guide the glass panel 22 for movement. A solar cell 28 is shown on the panel 22 and connected by wires 30 to a cord 32. Cord 32 extends to a terminal 34 mounted within the channel 24. As shown, cord 32 is helically coiled. Although a solar cell 28 is illustrated, other electrical components on the glass panel may also be utilized and may benefit from this invention.

Figure 2:
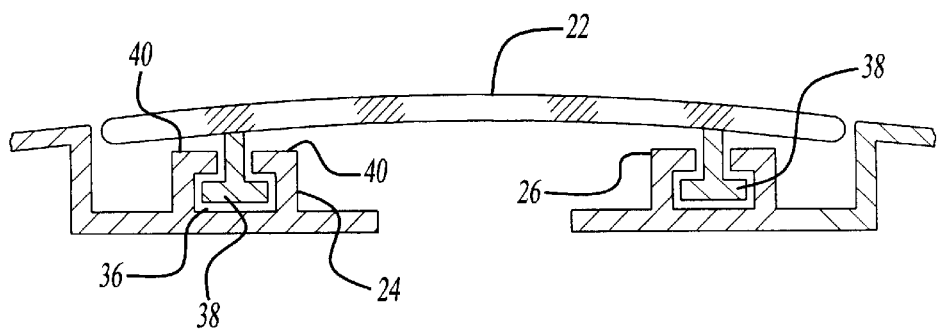
FIG. 2 is a cross-sectional view through the FIG. 1 panel.

As shown in FIG. 2, as known, the panel 22 incorporates guide structure 38 which extends into a space 36 in the channels 24 and 26. Inwardly extending ears 40 may extend inwardly to receive and secure guide structure 38 within the channels 34 and 26.

Figure 3:
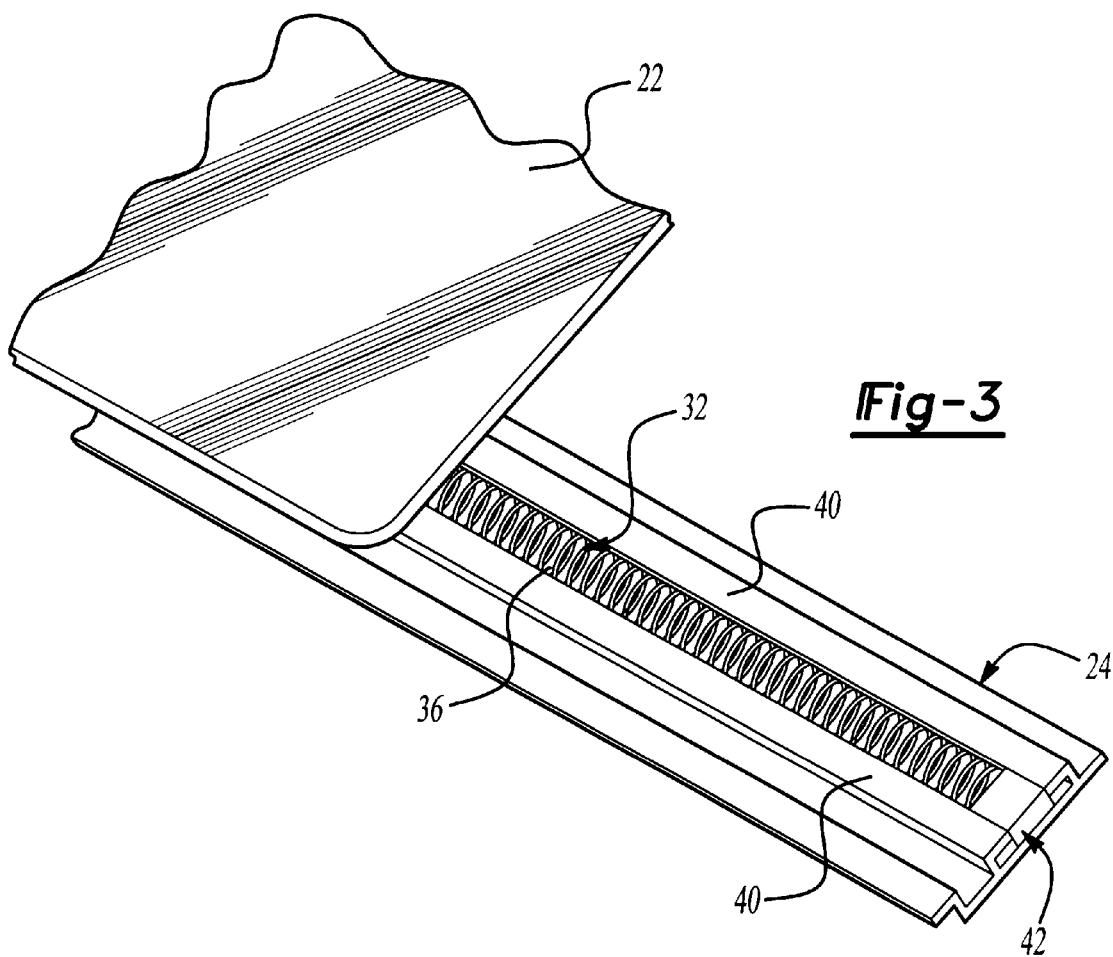
FIG. 3 shows the inventive cord in a first position.
Figure 4:
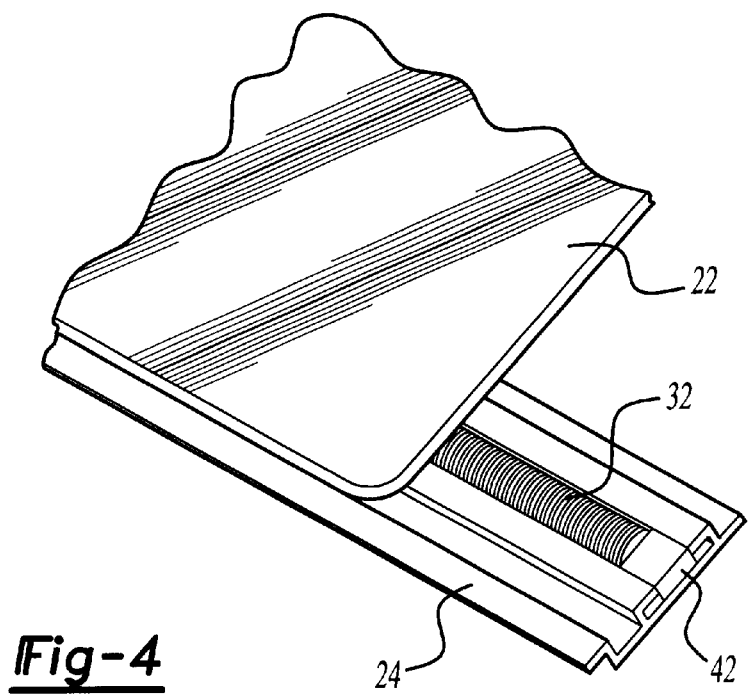
FIG. 4 shows the cord having moved to a compressed position.

As shown in FIG. 3, the cord 32 may be of the retractable type such as utilized in telephone cords. The cord 32 is preferably received within the space 36 defined by the channel 34, and inwardly of the laterally inwardly extending ears 40. As shown a connector 42 may be placed in the channel 34 at an end for connection to appropriate controls, motor, etc. In the FIG. 3 position, the cord is stretched with the glass panel being in its closed position. As the glass panel moves to an open position such as is shown in FIG. 4, the cord is retracted or compressed. Again, during this movement, the end of the structure 38 will be directly in contact with the cord 32 and moving the cord 32. Further, the cord 32 is protected and guided by the channel 24, and within the space 36.

A preferred embodiment of this invention has been disclosed, however, a worker in this art would recognize that certain modifications will come within the scope of this invention. For that reason, the following claims should be studied to determine the true scope and content of this invention.

What is claimed is:

1. A moving glass panel system in a vehicle comprising:
   a moving glass panel moveable between open and closed positions within a vehicle frame;
   at least one channel for guiding said moving glass panel between said open and closed positions;
   an electrical component mounted on said moving glass panel; and
   a retractable cord connecting said electrical component to a connection block, said cord being received within said at least one channel.

2. A system as set forth in claim 1, wherein said at least one channel includes laterally inwardly extending ears defining a space, and said cord being received within said space.

3. A system as set forth in claim 1, wherein said retractable cord is coiled on a helix, and is expandable and retractable.

4. A system as set forth in claim 1, wherein said panel has a structure for being guided within said at least one channel, said structure being connected to said retractable cord.

5. A system as set forth in claim 1, wherein there are a pair of said at least one channel with said retractable cord only being received in one of said channels.

6. A system as recited in claim 1, wherein said electrical component is a solar cell.

7. A moving glass panel in a vehicle comprising:
   a moving glass panel moveable between an opened and closed position within a vehicle frame;
   a pair of channels for guiding said moving glass panel between said open and closed positions;
   a solar cell mounted on said moving glass panel; and
   a helically coiled retractable cord connecting said electrical component to a connection block, said helically coiled retractable cord being received within one of said channels.

* * * * *